United States Patent [19]
Nagasawa et al.

[11] Patent Number: 6,016,297
[45] Date of Patent: Jan. 18, 2000

[54] INFORMATION REPRODUCTION METHOD AND APPARATUS THAT MOVE LIGHT BEAM TOWARD OUTER PERIMETER OF OPTICAL DISK IN RESPONSE TO TRACKING ERROR

[75] Inventors: Masaya Nagasawa, Yokohama; Masatoshi Sato, Machida, both of Japan

[73] Assignee: Nikon Corporation, Tokyo, Japan

[21] Appl. No.: 09/252,210

[22] Filed: Feb. 18, 1999

Related U.S. Application Data

[62] Division of application No. 08/786,106, Jan. 17, 1997, abandoned.

[30] Foreign Application Priority Data

| Jan. 17, 1996 | [JP] | Japan | 8-005570 |
| Feb. 6, 1996 | [JP] | Japan | 8-019797 |
| Jan. 17, 1997 | [JP] | Japan | 9-006237 |

[51] Int. Cl.[7] .................................................. G11B 7/095
[52] U.S. Cl. ............................................ 369/54; 369/44.32
[58] Field of Search ............................ 369/44.32, 44.28, 369/54, 44.25, 121, 116, 58, 13, 59

[56] References Cited

U.S. PATENT DOCUMENTS

| 4,406,000 | 9/1983 | Shoji et al. . |
| 4,414,655 | 11/1983 | Shoji et al. . |
| 4,611,316 | 9/1986 | Takeuchi et al. .................... 369/44.32 |
| 4,937,809 | 6/1990 | Miyadera et al. . |
| 5,181,194 | 1/1993 | Horie ................................... 369/44.25 |
| 5,367,515 | 11/1994 | Yamazaki et al. . |
| 5,402,402 | 3/1995 | Kagami et al. ...................... 369/44.32 |
| 5,586,099 | 12/1996 | Finkelstein et al. . |

FOREIGN PATENT DOCUMENTS

| 4-6636 | 1/1992 | Japan . |

Primary Examiner—Thang V. Tran
Attorney, Agent, or Firm—Oliff & Berridge, PLC

[57] ABSTRACT

An information reproduction method and apparatus reproduces information recorded on an optical disk by projecting a beam of light that has a variable power, determined according to its position in the radial direction of the optical disk. According to a first embodiment of the invention, the projection of the beam of light is moved to the outer perimeter of the radius of the optical disk when it is not possible to move the beam of light so as to correctly follow the information recording tracks formed on the optical disk. As an alternative to the first embodiment (or in addition thereto), the projection of the light beam can be controlled such that the focus of the beam of light is removed from the recording surface of the optical disk when it is not possible to move the beam of light so as to correctly follow the information recording tracks formed on the optical disk. For example, the light beam can be focused on a point further than (i.e., beyond) the surface of the disk. As another alternative, the beam of light is projected at or below the power that does not destroy the recorded information at the innermost perimeter of the optical disk during seek actions that occur when changing the tracks to be reproduced. When the seek actions end and the intended tracks are recorded, the power of the beam of light is set to the power necessary to reproduce those tracks.

12 Claims, 6 Drawing Sheets

INFORMATION REPRODUCTION METHOD AND APPARATUS THAT MOVE LIGHT BEAM TOWARD OUTER PERIMETER OF OPTICAL DISK IN RESPONSE TO TRACKING ERROR

This is a Division of application Ser. No. 08/786,106 filed Jan. 17, 1997 now abandoned. The entire disclosure of the prior application is hereby incorporated by reference herein in its entirety.

BACKGROUND OF THE INVENTION

1. Field of the Invention

The present invention relates to information reproduction apparatus, and in particular, to information reproduction apparatus and methods using rewriteable optical disks such as, for example, MO (magneto-optical) disks, phase variation optical disks and the like.

2. Description of Related Art

In the past, when reproducing information from rewriteable optical disks such as MO and phase variation type optical disks and the like, the information was reproduced using a fixed light output that was sufficiently lower than the light output (laser output) used during recording and erasing so as not to accidentally delete or destroy the recorded information. That is, if the reproduction power of the light output during reproduction is Pr, and the maximum value of the reproduction power that does not destroy the information is Prmax, then information was reproduced using a reproduction power Pr such that Pr=fixed (constant) and Pr≦Prmax. Thus, a fixed reproduction power less than or equal to Prmax was used.

Meanwhile, in recent years, numerous methods have been conceived in order to increase the recording capacity of optical disks. Fundamentally, it is necessary to make the intervals between the recording tracks narrow and to make the length of the smallest recording marks smaller in order to increase the recording density. In this case, particularly by making the length of the recording marks smaller, the signal amplitude of the reproduced signals corresponding to each mark becomes smaller due to the influence of the OTF (optical transfer function) of the optical system.

The reproduced signals include: amp noise produced by the reproduction amplifier, strength variation noise from the hard disk media and the semiconductor laser that functions as the light source, and shot noise caused during photoelectric conversion in the detector, etc. Consequently, as the signal amplitude corresponding to the marks has become smaller pursuant to the shortening of the mark length, there is a problem in that the desired signals become buried by the noise, making it impossible to reproduce the signals correctly.

Thus, the signal amplitude of the reproduced signals should be made greater, and the noise should be made relatively lower compared to the signal amplitude. The influence of the noise components that are not dependent on the amount of introduced light, such as, for example, the amp noise, etc., can be made relatively smaller by increasing the amount of light introduced into the reproduced signal detector. For example, if the reproduction power Pr is doubled, provisionally, the signal amplitude will be doubled, but the various types of noise described above will not increase much because they are not dependent on the reproduction power. Thus, the S/N (signal to noise) ratio (the ratio of the noise in relation to the reproduced signals) can be nearly doubled, and it becomes possible to reproduce correctly the signals without receiving the influence of noise.

Usually, the ZCAV (Zone-Cav) format is applied in high-density recording. In the ZCAV format, the entire surface of the optical disk is partitioned into several areas in the radial direction, and recording and reproduction are performed such that the smallest marks in each area are about the same length. By doing this, because the number of revolutions is constant, the recording and reproduction frequency reaches a maximum at the outer perimeter of the optical disk, and a wide frequency band becomes necessary to reproduce the signals.

Meanwhile, because the amp noise of the reproduced signals is thermal circuit noise and has the property of becoming larger as the frequency rises, the noise becomes greater when reproducing an outer perimeter of a disk, which has a high recording and reproduction frequency compared to the inner perimeter, causing the S/N ratio to become worse. Also, the maximum power Prmax that does not destroy the recorded information is dependent on the linear velocity of the light spot on the disk, such that it becomes greater in proportion to roughly ½ times the linear velocity. Accordingly, in order to make the smallest marks for recording and reproduction smaller across the entire surface of the disk, reproduction methods have been considered in which the reproduction power Pr that does not destroy the information in the inner perimeter of the disk, which has a smaller Prmax, is made smaller, and the reproduction power Pr is made greater in order to improve the S/N ratio in the outer perimeter of the disk, which has a greater Prmax.

Consequently, with such conventional information reproduction apparatus, there was a problem that, due to changing the reproduction power between the inner perimeter and the outer perimeter, when errors occurred, for example, tracking failures due to various causes, such as when tracking the intended tracks by randomly seeking the tracks, and the like, there was the danger of damaging the data of the inner perimeter by the optical head moving into the inner perimeter while in a state of high reproduction power suitable for the outer perimeter.

SUMMARY OF THE INVENTION

Embodiments of the present invention are intended to provide an information reproduction apparatus that can prevent the recorded data from being destroyed even when the tracking has failed.

In order to address the above and other problems, according to a first embodiment of the invention, an information reproduction method and apparatus reproduce information recorded on an optical disk by projecting a beam of light that has a variable power according to its position in the radial direction of the optical disk. The projection of the beam of light is moved to (or at least toward) the outer perimeter of the radius of the optical disk when it is not possible to move the beam of light so as to correctly follow the information recording tracks formed on the optical disk.

As an alternative to the first embodiment (or in addition thereto), the projection of the light beam can be controlled such that the focus of the beam of light is moved away from the recording surface of the optical disk when it is not possible to move the beam of light so as to correctly follow the information recording tracks formed on the optical disk. For example, the light beam can be focused on a point farther than (i.e., beyond) the surface of the disk.

Embodiments of the invention are particularly useful when the optical disk has information recorded by the ZCAV method, and the power of the beam of light is projected onto the optical disk, changing the power for each zone. The optical disk can be a rewritable disk. Additionally, the optical disk can be a magnetic super resolution disk.

Preferably the detection that it is not possible to move the light beam so as to correctly follow the information recording tracks formed on the optical disk is performed by monitoring the tracking error signal level.

As an alternative to directing the beam of light to the disk outer perimeter, or to defocusing the beam of light, according to another embodiment, the beam of light is projected at a power that is not greater than a maximum power that would destroy the recorded information at the innermost perimeter of the optical disk during seek actions that occur when changing the tracks that are to be reproduced. When the seek actions end and the intended tracks are reached, the power of the beam of light is set to the power appropriate to reproduce those tracks.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

Figure 1:
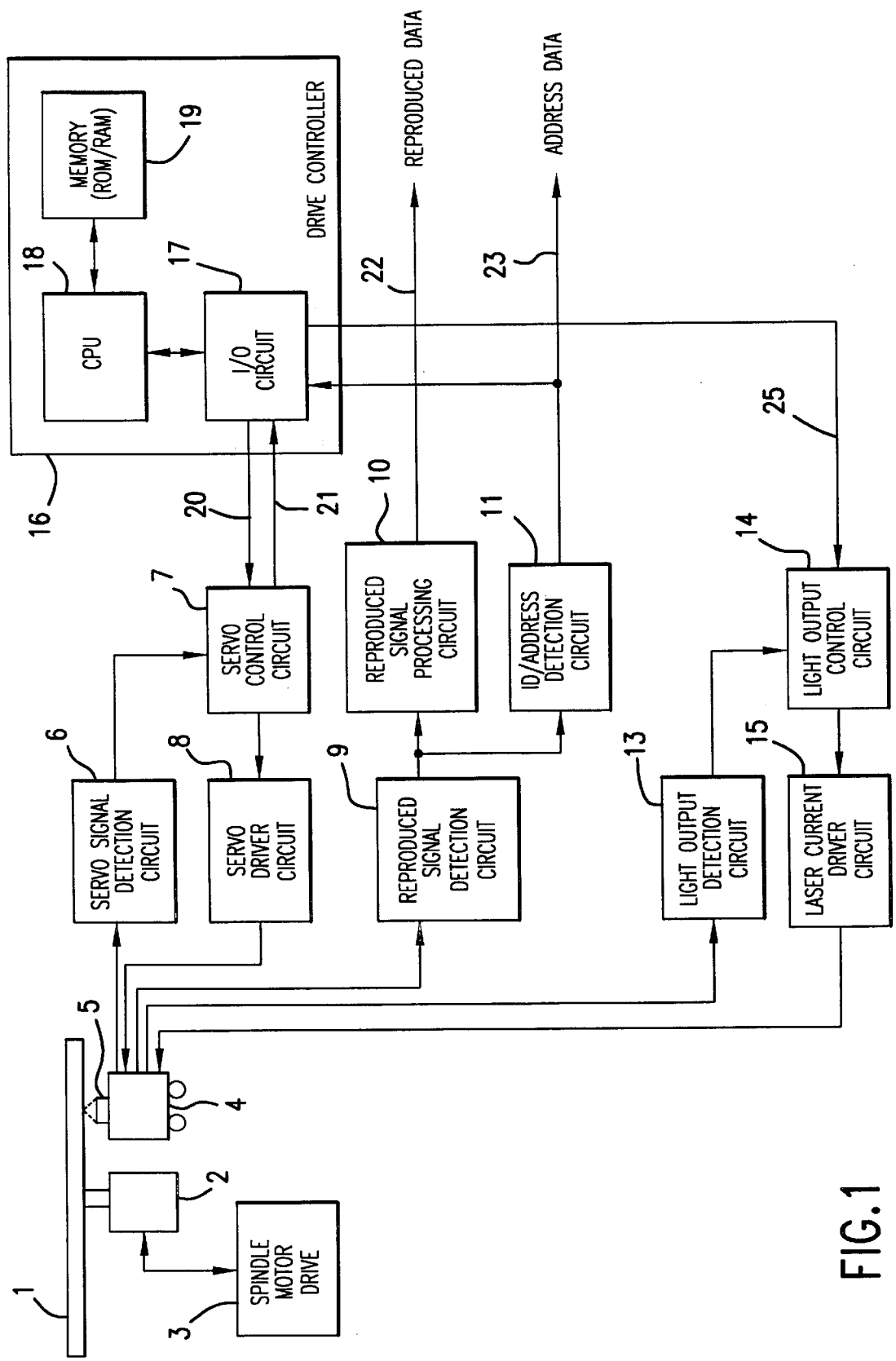
FIG. 1 is a block diagram of an information reproduction apparatus according to a first preferred embodiment of the present invention.

FIG. 1 is a block diagram showing the drive system of an information reproduction apparatus that reproduces optical disks according to a first preferred embodiment of the present invention. An example using the ZCAV (Zone-Cav) method is explained, in which the entire recording surface of the optical disk is partitioned into several regions in the radial direction, and recording and reproduction are performed such that the smallest marks in each area have approximately the same length.

In FIG. 1, a spindle motor 2 drives an optical disk 1. A spindle motor drive circuit 3 controls the spindle motor 2 so that it revolves at a constant number of revolutions (constant angular velocity). An optical head 4, having a semiconductor laser (not shown), an objective lens (not shown), and a PIN photodiode (not shown), performs recording and reproduction of information on any track provided on the recording surface of the optical disk 1. An actuator 5 controls the focusing of the beam of light projected from the optical head 4 and the following (tracking) of the tracks on the optical disk 1.

Based on the output of the four- or six-partitioned PIN photodiode (not shown) provided on the optical head, which detects the reflected light from the optical disk 1, a servo signal detection circuit 6 generates a tracking error signal (TE) indicating a positional error between the beam of light and the track, a track total signal (TT) indicating the total reflected light from the track, a focus error signal (FE) indicating a focus error, and an Itotal signal (Itotal) indicating the total illumination of the focusing. A servo control circuit 7 controls the actuator 5 such that the beam of light is projected at the specified focus for the desired tracks based on the focus error signal (FE). The servo control circuit 7 also controls the actuator 5 such that the projection of the beam of light continues to follow the desired tracks. The servo control circuit 7 also detects tracking errors in which following of the desired tracks becomes impossible. For example, circuit 7 may detect that the amount of deviation between the projection of the beam of light and the desired track has become greater than a specified value. A servo driver circuit 8 drives the actuator 5 according to the output of the servo control circuit 7.

A reproduced signal detection circuit 9 detects the reproduced signals based on the output of the PIN photodiode (not shown) of the optical head 4, which detects the reflected light. A reproduced signal processing circuit 10 outputs the information recorded on the user data parts of the tracks as reproduced data 22 based on the reproduced signals output from the reproduced signal detection circuit 9.

An ID/address detection circuit 11 outputs the information recorded on the address parts of the sectors (recording units) as address data 23 based on the reproduced signals from the reproduced signal detection circuit 9. This address data can be used as data indicating the position in the radial direction of the disk on which the beam of light was projected.

A light output detection circuit 13 detects the light output actually emitted based on the output from the PIN photodiode (not shown), which detects the output of the beam of light projected from the semiconductor laser (not shown) of the optical head 4. A light output control circuit 14 controls the light output of the semiconductor laser such that the desired light output is obtained based on specified light output setting signals 25. A laser current driver circuit 15 controls the drive current of the semiconductor laser according to the output from the light output control circuit 14 using APC (Automatic Power Control).

A drive controller 16 controls each component of the drive system of the information reproduction apparatus. An I/O circuit 17 exchanges the various types of signals with each component of the drive system. A CPU 18 controls the radial position of the optical head 4 and the focus of the beam of light using control instructions 20 and based on error occurrence reports 21. The CPU 18 also outputs light output setting signals 25 indicating the value of the light output of the semiconductor laser based on the address data 23 and various types of control information stored in memory (ROM/RAM) 19.

Next, the actions of the information reproduction apparatus of a first preferred embodiment are explained referring to FIG. 1. The spindle motor 2 causes the optical disk 1 to revolve at a constant number of revolutions (constant angular velocity) under the control of the spindle motor drive circuit 3. The beam of light (laser light) projected from the semiconductor laser of the optical head 4 is reflected by the recording surface of the optical disk 1, and, along with being detected by the four- or six-partitioned PIN photodiode provided on the optical head, undergoes IV conversion and addition-subtraction processing (as are known), and is input into the servo signal detection circuit 6 as detected output. Based on this detected output, the servo signal detection circuit 6 generates the tracking error signal (TE) indicating a positional error between the beam of light and the track, the track total signal (TT) indicating the total reflected light from the track, the focus error signal (FE) indicating a focus error and the Itotal signal (Itotal) indicating the total illumination of the focusing.

The servo control circuit 7 controls the actuator 5 via the servo driver circuit 8 such that the signal amplitude VTE of the tracking error signal TE does not exceed the tracking residual voltage VT0 corresponding to the tracking residue allowed by the specified technical specifications. By this control process, tracking servo control is performed such that the beam of light always follows the desired tracks. The servo control circuit 7 also controls the actuator 5 via the servo driver circuit 8 such that the signal amplitude VFE of the focusing error signal FE does not exceed the focusing residual voltage VF0 corresponding to the focusing residue allowed by the specified technical specifications. By this control, focusing servo control is performed such that the light spot of the beam of light always becomes the specified focus on the recording surface of the optical disk 1. By this process, focusing servo control and tracking servo control are performed, and the information is reproduced from the desired tracks of the optical disk 1 as follows.

Figure 3:
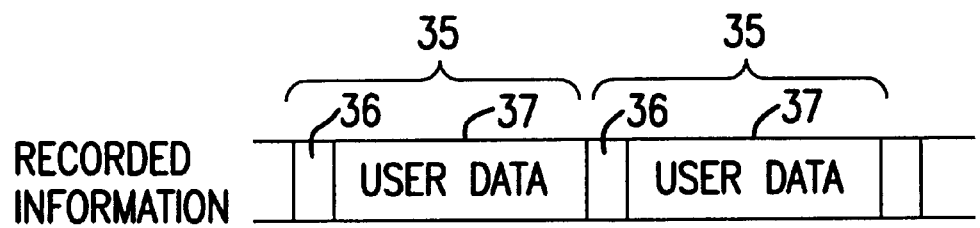
FIG. 3 shows the recorded information provided on the recording surface of the optical disk using the information reproduction apparatus of the first preferred embodiment of the present invention.

On the optical head 4 is provided a PIN photodiode that detects the reflected light from the optical disk 1. The reproduced signals are output from the PIN photodiode and are IV-converted and amplified in the reproduced signal detection circuit 9. The reproduced signal processing circuit 10 and the ID/address detection circuit 11 perform waveform fitting and binary conversion for these reproduced signals so as to reproduce the information recorded on the user data parts 37 and the address parts 36, respectively, of the sectors 35, which are the recording units provided on the recording surface of the optical disk as shown in FIG. 3. Circuits 10 and 11 output this information as reproduced data 22 and address data 23.

The address data 23 is input to the CPU 18 via the I/O circuit 17 of the drive controller 16. Then, the light output of the semiconductor laser is determined for the recording area on the optical disk 1 indicated by the address data 23. Specifically, the value of the light output (i.e., the reproduction power Pr) of each area is stored in advance in memory 19. Thus, the output of the beam of light projected from the semiconductor laser is determined for the recording area on the optical disk 1 indicated by the present address data 23 by referring to memory 19. The light output setting signal 25 is output based on this stored information. The light output setting signal 25 output from the CPU 18 is input to the light output control circuit 14 via the I/O circuit 17.

In order to prevent variations of light output due to temperature variations and seasonal variations, the light output actually being projected is detected by a light output detection circuit 13 via the PIN photodiode provided on the optical head 4. The drive current provided to the semiconductor laser via the laser current driver circuit 15 is controlled by the action of APC (Automatic Power Control) by the light output control circuit 14 such that the error between the detected value and the value set by the light output setting signal 25 comes within an allowable range.

Figure 2:
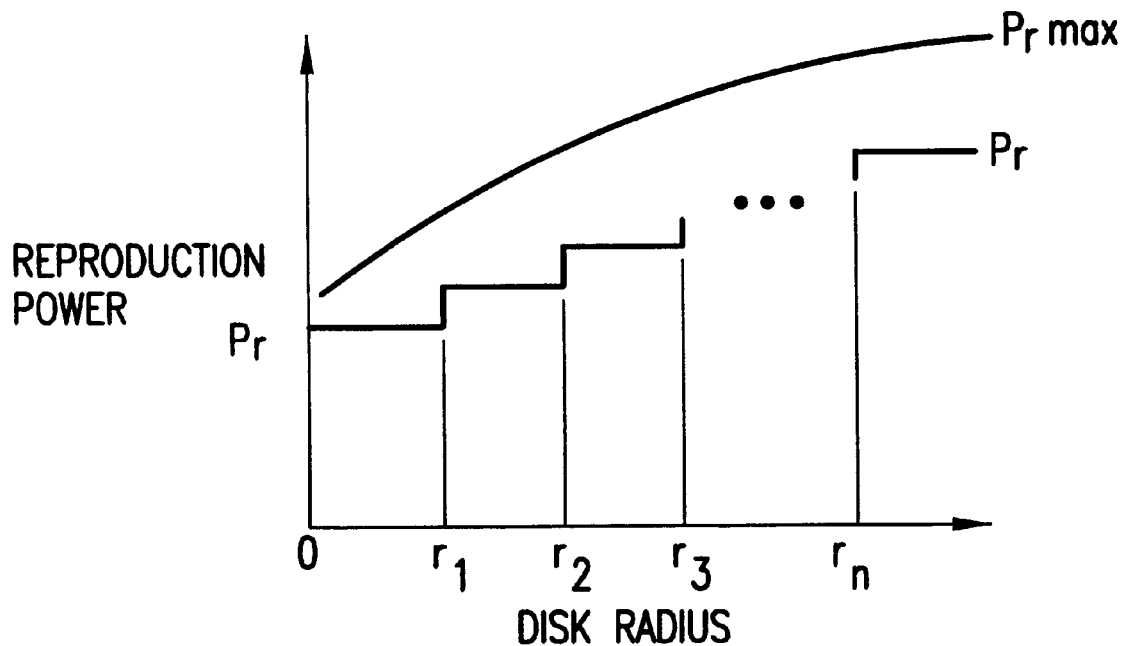
FIG. 2 is a graph showing the relationship between the radial position of the disk and the reproduction power Pr in the information reproduction apparatus of the first preferred embodiment of the present invention.

FIG. 2 is an explanatory drawing showing one example of the relationship between the disk radial position of the optical disk and the reproduction power Pr. As described previously, the maximum value of the reproduction power that does not destroy the recorded information, that is, the maximum allowable reproduction power Prmax, is dependent upon the linear velocity of the light spot on the disk. Because Prmax becomes greater in proportion to roughly ½ times the linear velocity, when the number of revolutions of the optical disk 1 is constant (angular velocity constant), Prmax increases in proportion to ½ times the disk radius r. Consequently, when tracking misses, a tracking error results in the state of reproduction of the recorded information. However, by moving the optical head 4 in the direction of greater Prmax, that is, to (or at least toward) the outer perimeter of the optical disk 1, the reproduction power Pr necessarily becomes a smaller value than the Prmax in that position of the optical head 4 (relative to disk 1). Therefore, it becomes possible to suppress destruction of the data even when tracking errors occur.

Figure 4:
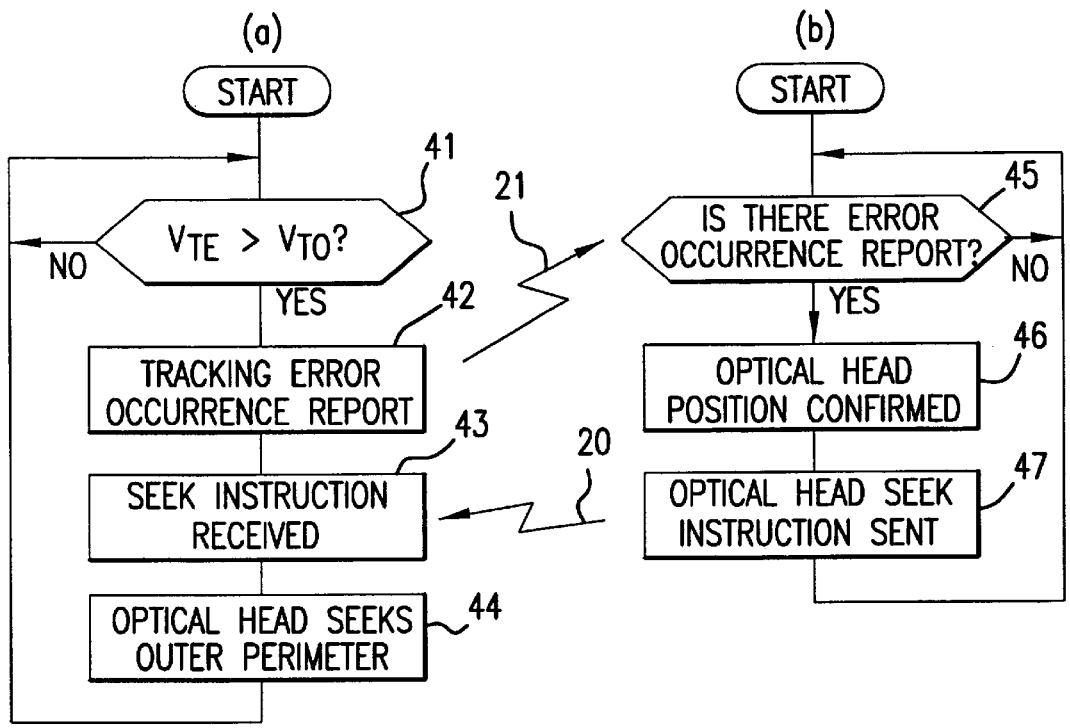
FIG. 4 is a flow chart showing a first example of the processing operations of the information reproduction apparatus of the first preferred embodiment of the present invention.

FIG. 4 is a flow chart showing the processing operations in an information reproduction apparatus of the first preferred embodiment of the present invention. In particular, FIG. 4 shows (a) the processing operations of the servo control circuit 7, and (b) the processing operations of the CPU 18. The servo control circuit 7 constantly monitors the occurrence of tracking errors by comparing the amplitude (VTE) of the tracking error signals indicating the positional errors between the beam of light generated by the servo signal detection circuit 6 and the tracks, and the allowable fixed tracking residual voltage VT0 (step 41). When VTE>VT0, it is determined that a tracking error has occurred (step 41: yes), and the occurrence of the tracking error is reported to the CPU 18 by issuance of an error occurrence report 21 (step 42). The CPU 18 constantly monitors the error occurrence reports 21 reported via the I/O circuit 17 from the servo control circuit 7 (step 45). When the occurrence of a tracking error is sensed (step 45: yes), the radial position of the optical head 4 is confirmed (step 46) based on the address data 23 from the ID/address detection circuit 11. Then, a specified control instruction 20 is sent to move (seek) the optical head 4 to the outer perimeter from the detected radial position (step 47) without increasing the reproduction power Pr of the beam of light. The servo control circuit 7 receives this control instruction 20 (step 43). Because this instruction is a seek instruction, the servo control circuit 7, via the servo driver circuit 8, moves the radial position of the optical head 4 from the present position to (or at least toward) the outer perimeter of the optical disk 1 (step 44). Between starting and ending of the movement of the optical head 4 to the outer perimeter, the actions of steps 41 and 42, and the actions of steps 45–47 are not performed.

In the present preferred embodiment, when tracking misses and a tracking error is detected while in the state of reproducing the recorded information by making the beam of light follow the tracks on the optical disk 1, or while in the state of moving to the desired track, the radial position of the optical head 4 is moved to the outer perimeter of the optical disk 1 without increasing the reproduction power Pr of the beam of light. Therefore, the maximum value of the reproduction power that does not destroy the recorded information, that is, the maximum allowable reproduction power Prmax, becomes relatively greater in relation to the reproduction power Pr at that time, and it becomes possible to avoid the destruction of the information recorded on the optical disk 1. When moving the optical head 4 toward the outer perimeter according to detection of tracking errors, the optical head 4 may be moved by only a predetermined amount toward the outer perimeter from the radial position at the time of the error occurrence, or the optical head 4 may be controlled to move to a fixed position, for example, at the outermost perimeter of the optical disk 1.

Figure 5:
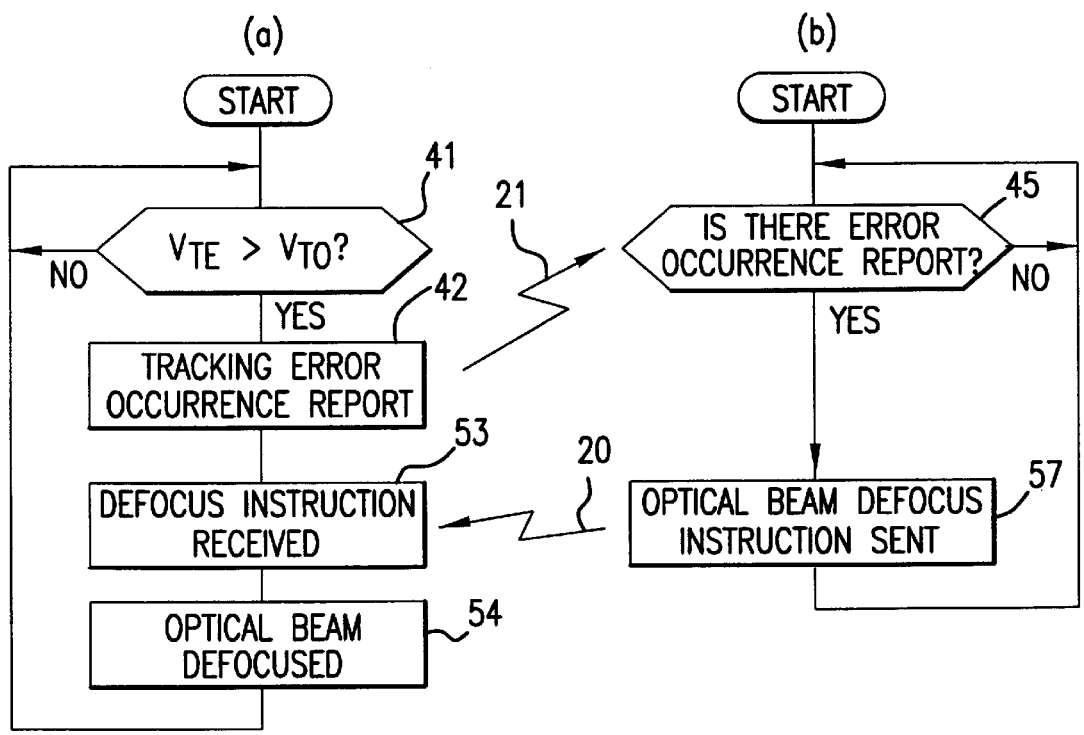
FIG. 5 is a flow chart showing a second example of the processing operations of the information reproduction apparatus of the first preferred embodiment of the present invention.

Next, another example of the processing operations in the information reproduction apparatus of the first preferred embodiment of the present invention is explained. FIG. 5 is a flow chart showing the processing operations. In particular, FIG. 5 shows (a) the processing operations of the servo control circuit 7, and (b) the processing operations of the CPU 18. In the same manner as described above with respect to FIG. 4, the servo control circuit 7 constantly monitors the occurrence of tracking errors by comparing the amplitude (VTE) of the tracking error signals indicating the positional errors between the beam of light generated by the servo signal detection circuit 6 and the tracks, and the allowable fixed tracking residual voltage VT0 (step 41). When VTE>VT0, it is determined that a tracking error has occurred (step 41: yes), and the occurrence of the tracking error is reported to the CPU 18 by issuance of an error occurrence report 21 (step 42). The CPU 18 constantly monitors the error occurrence reports 21 reported via the I/O circuit 17 from the servo control circuit 7 (step 45). When the occurrence of a tracking error is sensed (step 45: yes), a specified control instruction 20 is sent to shift the focus of the beam of light to a direction farther than the recording surface of the optical disk 1 (step 57). In other words, the light beam is defocused. The servo control circuit 7 receives this control instruction 20 (step 53). Also, because that instruction is a defocusing instruction, the servo control circuit 7, by controlling the actuator 5 via the servo driver circuit 8, defocuses the focus of the beam of light to a direction farther than the recording surface of the optical disk (step 54).

In the present preferred embodiment, when tracking misses and a tracking error is detected while in the state of reproducing the recorded information by making the beam of light follow the tracks on the optical disk 1, or while in the state of moving to the desired track, because the focus of the beam of light is defocused to a direction farther than the recording surface of the optical disk 1, the radial position (e.g., the size or area) of the light spot of the beam of light projected on the recording surface of the optical disk 1 becomes larger. Therefore, the energy projected for a unit area on the recording surface becomes smaller, and it becomes possible to avoid destruction of the information recorded on the optical disk 1.

Figure 6:
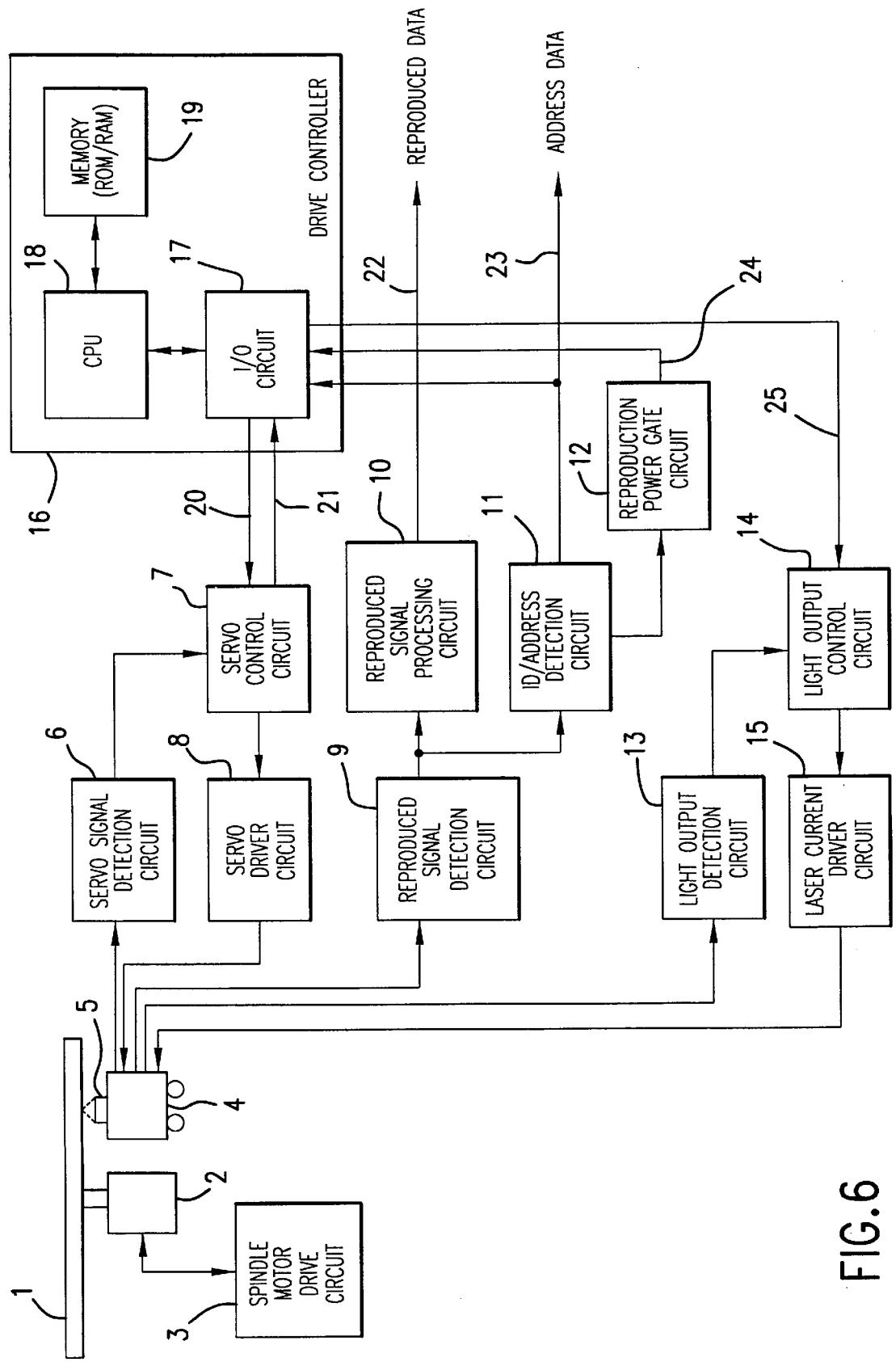
FIG. 6 is a block diagram of an information reproduction apparatus according to a second preferred embodiment of the present invention.

FIG. 6 is a block diagram showing the drive system of an information reproduction apparatus for reproducing information on optical disks according to a second preferred embodiment of the present invention. As in the first preferred embodiment, an example using the ZCAV (Zone-Cav) method is explained, in which the entire recording surface of the optical disk is partitioned into several regions in the radial direction, and recording and reproduction are performed such that the smallest marks in each area have approximately the same length.

In FIG. 6, the optical disk 1, spindle 2, spindle motor drive circuit 3, optical head 4, actuator 5, servo signal detection circuit 6, servo control circuit 7, servo driver circuit 8, reproduced signal detection circuit 9, reproduced signal processing circuit 10, and ID/address detection circuit 11 are identical to those in FIG. 1. A reproduction power gate circuit 12 outputs reproduction power gate signals 24 for processing according to the detected timing of the address parts detected by the ID/address detection circuit 11. The light output detection circuit 13, light output control circuit 14, laser current driver circuit 15, drive controller 16, and I/O circuit 17 are identical to those in FIG. 1. The CPU 18 controls movement of the optical head 4 to the desired track based on a seek start signal 20 and a seek finish signal 21. The CPU 18 also outputs a light output setting signal 25 indicating the light output value of the semiconductor laser based on various types of control information stored in memory (ROM/RAM) 19, correlated to address data 23 and power gate signals 24.

Next, the operations of the present apparatus are explained, referring to FIG. 6. The spindle motor 2 makes the optical disk 1 revolve at a constant number of revolutions (constant angular velocity) by control of the spindle motor drive circuit 3. The beam of light (laser light) projected from the semiconductor laser of the optical head 4 is reflected by the recording surface of the optical disk 1, and, along with being detected by a four- or six-partitioned PIN photodiode provided in the optical head 4, undergoes IV conversion and addition-subtraction processing, and is input into the servo signal detection circuit 6 as detected output. Based on this detected output, the servo signal detection circuit 6 generates the tracking error signal (TE) indicating a positional error between the beam of light and the track, the track total signal (TT) indicating the total reflected light from the track, the focus error signal (FE) indicating a focus error and the Itotal signal (Itotal) indicating the total illumination of the focusing.

The servo control circuit 7 performs tracking servo control such that the beam of light always follows the desired tracks, by controlling the actuator 5 via the servo driver circuit 8 such that the signal amplitude VTE of the tracking error signal TE does not exceed the tracking residual voltage VT0 corresponding to the tracking residue allowed by the specified technical specifications. The servo control circuit 7 also performs focusing servo control such that the light spot of the beam of light always has the specified focus on the recording surface of the optical disk 1, by controlling the actuator 5 via the servo driver circuit 8 such that the signal amplitude VFE of the focusing error signal FE does not exceed the focusing residual voltage VF0 corresponding to the focusing residue allowed by the specified technical specifications. By this process, focusing servo control and tracking servo control are performed, and the information is reproduced from the desired tracks of the optical disk 1 as follows.

On the optical head 4 is provided a PIN photodiode that detects the reflected light from the optical disk 1. The reproduced signals are output from the PIN photodiode and are IV-converted and amplified in the reproduced signal detection circuit 9. The reproduced signal processing circuit 10 and the ID/address detection circuit 11 perform waveform fitting and binary conversion for these reproduced signals so as to reproduce the information recorded on the user data parts 37 and the address parts 36, respectively, of the sectors 35, which are the recording units provided on the recording surface of the optical disk as shown in FIG. 3. Circuits 10 and 11 output this information as reproduced data 22 and address data 23. The reproduction power gate circuit 12 outputs reproduction power gate signals 24 corresponding to the read-out timing of the address parts according to the detection of the address parts in the sector header portion of the data made by the ID/address detection circuit 11.

The address data 23 and the reproduction power gate signals 24 are input to the CPU 18 via the I/O circuit 17 of the drive controller 16. Then, the light output of the semiconductor laser is determined for the recording area on the optical disk 1 indicated by the address data 23.

Figure 7:
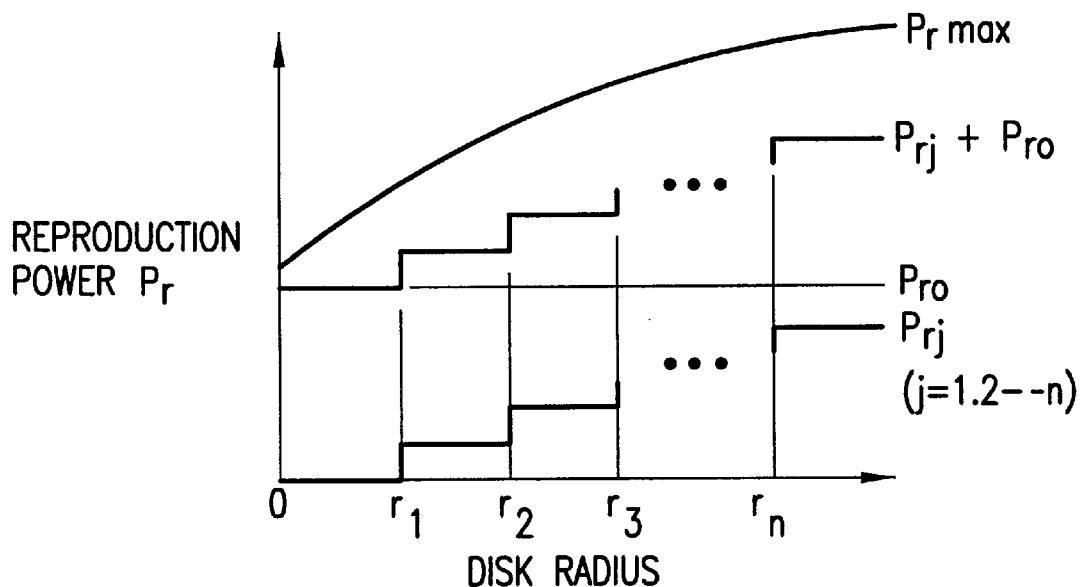
FIG. 7 is a graph showing the relationship between the radial position of the disk and the reproduction power Pr in the information reproduction apparatus of the second preferred embodiment of the present invention.

FIG. 7 illustrates the relationship between the disk radial position of the optical disk and the reproduction power Pr. As described previously, the maximum value of the reproduction power that does not destroy the recorded information, that is, the maximum allowable reproduction power Prmax, is dependent upon the linear velocity of the light spot on the disk. Because Prmax becomes greater in proportion to roughly ½ times the linear velocity, when the number of revolutions of the optical disk 1 is constant (constant angular velocity), Prmax increases in proportion to ½ times the disk radius r. Consequently, Prmax has its lowest value for the disk radius=r0, that is, the innermost perimeter track of the optical disk. Thus, Prmax in the innermost perimeter track of the optical disk 1 cannot be exceeded. Thus, a value near the value of Prmax for the innermost perimeter track is used as the base reproduction power Pr0.

When the optical head 4 is performing seek actions, the output of the beam of light projected from the semiconductor laser, that is, the reproduction power, is set to Pr0. By this process, it becomes possible to suppress destruction of the data even when tracking errors occur.

By setting the reproduction power for each area to a value that does not exceed the Prmax of the innermost perimeter of that area, and furthermore, by setting such reproduction power to a value near Prmax, it becomes possible to reproduce the information at a better S/N ratio compared to when reproducing the information at Pr0 (that is, the lowest power for the innermost area) regardless of the disk radius. This is particularly useful in the ZCAV method in which the disk radius is partitioned into several areas having different radii.

Consequently, during reproduction, the reproduction power is controlled such that a supplemental reproduction power Prj (j=1, 2, . . . , n) is set for each area, and the addition of the supplemental reproduction power Prj to the base reproduction power Pr0, described above, becomes the light output value of the semiconductor laser. Also, during seeking, the reproduction power is controlled such that the base reproduction power Pr0 becomes the light output value of the semiconductor laser. As a result, it becomes possible to suppress the destruction of the recorded data, in addition to being able to reproduce at a better S/N ratio.

In the present preferred embodiment, the light output setting values corresponding to the base reproduction power Pr0 and the supplemental reproduction power Prj for each area are stored in advance in memory 19. The output of the beam of light projected from the semiconductor laser (i.e., the light output setting signal 25) is determined based on the recording area on the optical disk 1 indicated by the address data 23.

In the present preferred embodiment, an example was explained in which a fixed supplemental reproduction power Prj was set for each area. However, the reproduction power may be made to vary along the curve indicating Prmax of FIG. 7 (rather than below the curve Prmax), and within a range not exceeding Prmax for each radial position of the optical disk 1. Additionally, the reproduction power may be made to change linearly from the inner perimeter to the outer perimeter rather than in steps. In addition, as the supplemental reproduction power Prj, a value including the base reproduction power Pr0 may be set and stored.

By this process, the light output setting signals 25 output from the CPU 18 are input into the light output control circuit 14 via the I/O circuit 17. In order to prevent variations of light output due to temperature variations and seasonal variations, the light output actually being projected is detected by a light output detection circuit 13 via the PIN photodiode provided on the optical head 4. The drive current provided to the semiconductor laser via the laser current driver circuit 15 is controlled by the action of APC (Automatic Power Control) such that the error between the detected value and the value set by the light output setting signal 25 comes within the allowable range. The seek actions and light output can be controlled by using the reproduction power gate signals 24.

Figure 8:
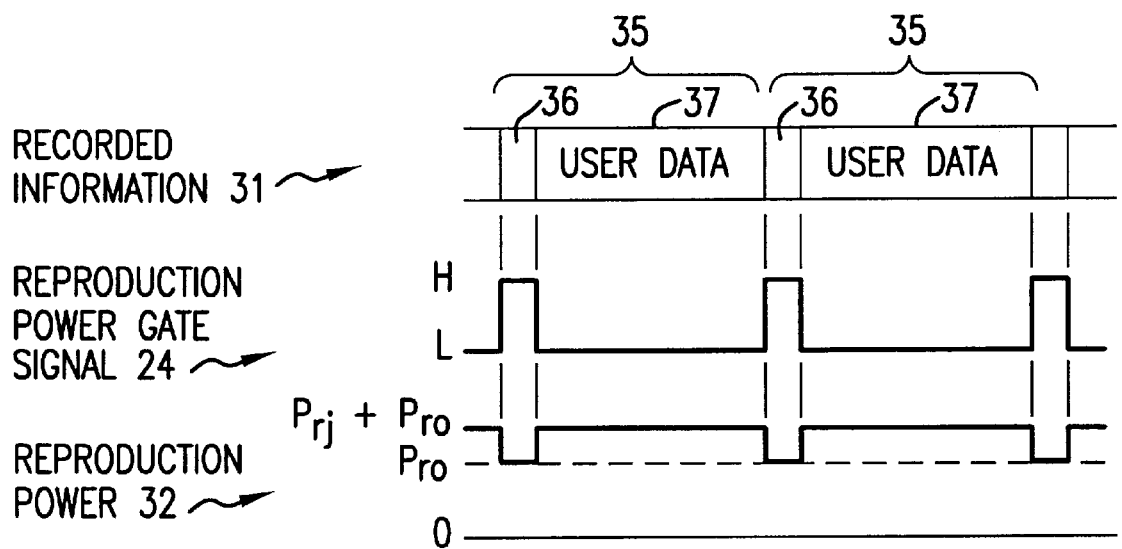
FIG. 8 shows the light output control by reproduction power gate signals of the information reproduction apparatus of the second preferred embodiment of the present invention.

FIG. 8 illustrates the control of light output using the reproduction power gate signals 24. In FIG. 8, the recorded information 31 on the optical disk 1 includes multiple sectors 35 provided in series following the tracks. The sectors 35 include an address part 36 in the header portion and a user data part 37 following the header portion. The ID/address detection circuit 11 detects the headers, and consequently the address parts 36, from the reproduced signals output from the reproduced signal detection circuit 9. Circuit 11 then outputs the reproduction power gate signals 24 with a timing corresponding to the detection of the address part 36.

The CPU 18 controls the seek actions according to the reproduction power gate signals 24. In particular, when the reproduction power gate signals 24 are at a high level, that is, when indicating the address parts 36, the reproduction power is set to the base reproduction power Pr0. When the reproduction power gate signals 24 are at a low level, that is, when indicating the user data parts 37, the reproduction power is set to (base reproduction power Pr0)+ (supplemental reproduction power Prj). The CPU 18 permits the start of seek actions only when the reproduction power gate signals 24 are at a high level, and sends seek action start signals 20 according to necessity. The CPU 18 also forbids the start of seek actions when the reproduction power gate signals 24 are at a low level. Consequently, the seek actions are not started when the reproduction power gate signals 24 are at a low level, that is, when the reproduction power for reproducing the user data parts 37 is higher, being (base reproduction power Pr0)+(supplemental reproduction power Prj). Thus, the seek actions are started only when the reproduction power gate signals 24 are at a high level, that is, when the reproduction power for reproducing the address parts 36 is lower, being the base reproduction power Pr0. Therefore, even when seeking of the intended tracks has failed, because the reproduction power is lower than the Prmax at the innermost perimeter, there is no destruction of the information on the optical disk 1.

In the above explanation, detection of the address parts 36 was made to have a high level as a theory of reproduction power gate signals 24, but there is substantially no change whatsoever if, for example, the address parts 36 were made to produce a low level while the user data parts 37 produced a high level.

Additionally, the S/N ratio of the signals of the address parts 36 decreases when reproducing the address parts 36 at the base reproduction power Pr0 in the outer perimeter. Therefore, the smallest recording mark length of the address parts 36 at the outer perimeter may be made larger than those at the inner perimeter. Because the signal amplitude of the signals reproduced in this manner becomes greater, it becomes possible to reproduce the address parts 36 at a better S/N ratio even though they are being reproduced at the base reproduction power Pr0. Because the address parts 36 have a data length sufficiently smaller in comparison to the user data parts 37, even when making the smallest recording mark length of the address parts at the outer perimeter greater than those at the inner perimeter, the reduction of the recording capacity of the user data parts 37 is trivial, and in no way becomes a problem in high-density reproduction.

In the above explanation, the conventional reproduction method was explained as an example. It is, however, possible to apply the present invention to variable reproduction power MO driver devices that use magnetic super resolution (MSR), and to phase change driver devices that reproduce at variable reproduction power, which are being developed for further increasing the density, and it is possible to obtain operational effects similar to those described above.

Reproduction operations using MSR are explained below. By using MSR, it becomes possible to reproduce assuredly information recorded at high density. The fundamental concepts of this method are largely as follows. The temperature of the recording media rises due to the projection of the reproduction beam. However, because the media is moving, the temperature in the advancing direction of the media within the spot of the reproduction beam reaches a relatively higher temperature. If a part within the spot is masked and made invisible by the light pick up using the characteristics of this temperature distribution, and only the visible part is reproduced, it is possible to reproduce only the information in the small part within the light spot. In short, it becomes possible to make the spot size of the reproduction beam substantially smaller.

Specifically, there have been proposed: (1) a type whereby the low-temperature part within the reproduction beam spot becomes reproducible (the high-temperature part becomes the mask); (2) a type whereby the high-temperature part becomes reproducible (the low-temperature part becomes the mask); and (3) a type whereby the high-temperature part becomes reproducible, and an even smaller reproducible part is realized by further masking the high-temperature part within the reproducible part. The principle of masked reproduction is based on the variation of transparency due to phase change. Descriptions of the use of magnetic-oriented variation due to variation of the magnetic exchange coupling force, and the like, have been published.

Figure 10A:
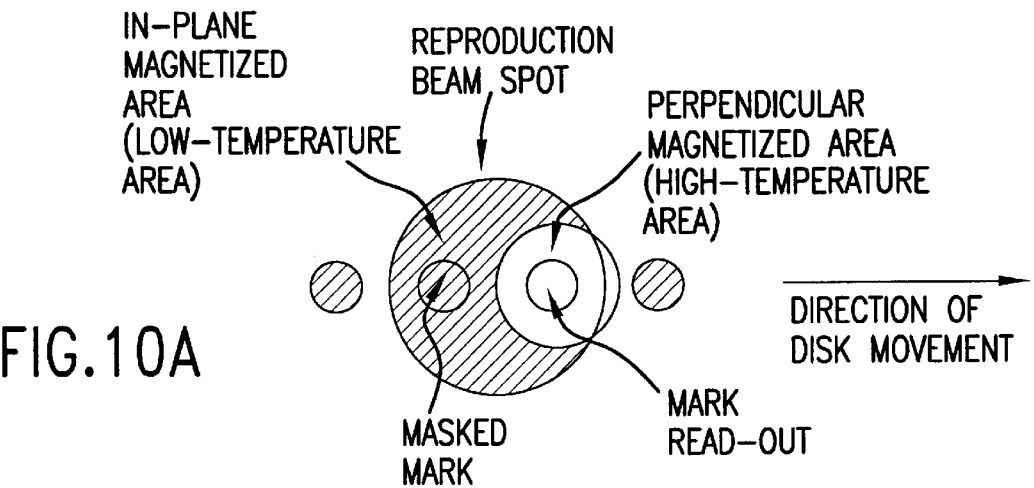
FIGS. 10A and 10B represent the principle of reproducing the information recorded at high density by magnetic super resolution.
Figure 10B:
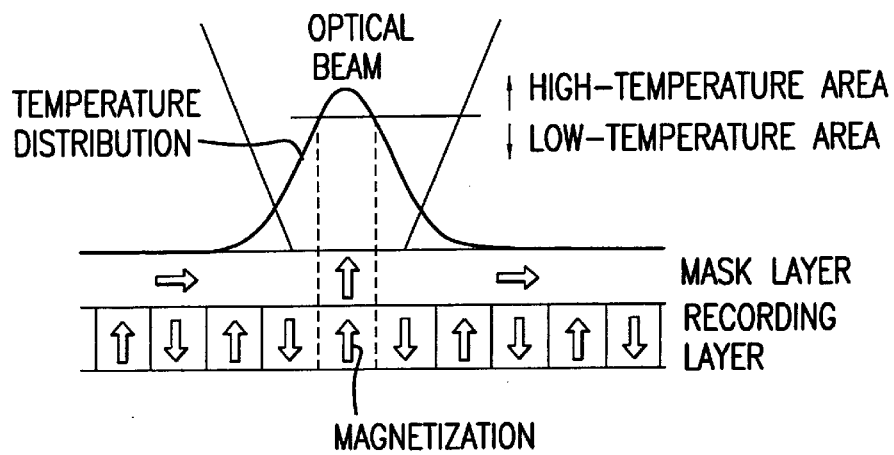

The principle using magnetic-oriented variation due to variation of the magnetic exchange coupling force is explained using FIGS. 10A and 10B. FIG. 10B represents the cross-section of the main parts of a magneto-optical disk and the temperature distribution of the part projected thereon by the reproduction beam. The magneto-optical disk has a mask layer and a recording layer. The information is recorded by varying the direction of magnetization perpendicular to the surfaces. The mask layer has an in-plain magnetization direction, whereas the recording layer provided on the mask layer has perpendicular magnetization. At the low-temperature area (at or below a fixed temperature), the mask layer exhibits in-plain magnetization. At the high-temperature area (at or above the fixed temperature), the mask layer has a perpendicular magnetization relative to the surface. The magnetization of the recording layer is copied to the mask layer at the high-temperature area with the exchange coupling force. Therefore, only the high-temperature area contributes to the reproduction of the information. The fixed temperature is set such that it is a small area in the vicinity of the center of the temperature distribution due to the projection of the reproduction beam. As a result, as shown in FIG. 10A, only the mark in the high-temperature area of a part of the reproduction beam spot is read out. Also, marks apart from the high-temperature area are not read out, even though these marks fall within the reproduction beam spot.

Figure 9:
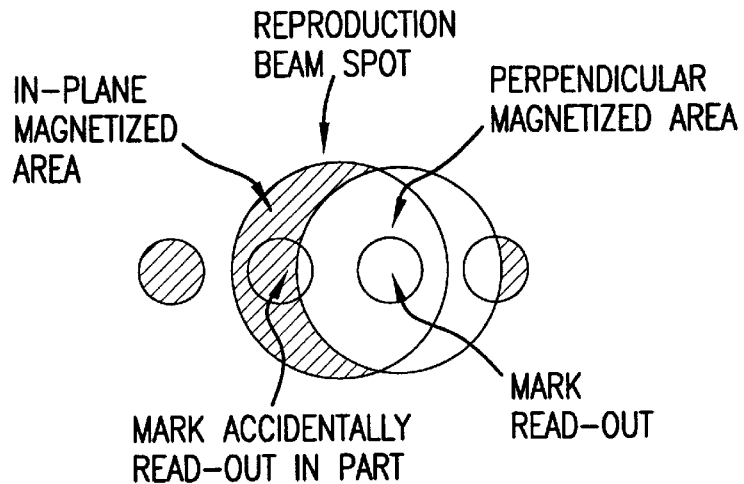
FIG. 9 represents the state of portions of an optical disk when the information recorded at a high density is reproduced using a reproduction beam strength higher than the optimum value.

For the conventional recording and reproduction of optical disks, there are the constant number of revolutions (constant angular velocity: CAV) method and the constant linear velocity (CLV) method. When performing high-speed recording and reproduction of information, the CAV method, which makes the optical disk revolve at a constant number of revolutions, is preferred. In this method, the linear velocities of the inner perimeter and the outer perimeter differ. Therefore, when the strength of the reproduction beam is kept as a constant, the temperature rise of the media at the inner perimeter and at the outer perimeter differs. In magnetic super resolution (MSR) media, because the size of the reproducible part is determined by the temperature of the media, when reproducing at a fixed reproduction beam strength, the reproducible part becomes larger at the inner perimeter because the temperature rise becomes greater and the high-temperature area becomes wider. The reproducible part becomes smaller at the outer perimeter because the temperature rise is smaller and the high-temperature area is narrower. For example, the state of reproduction at the inner perimeter, as shown in FIG. 9, becomes a cause of error due to reading out at the same time marks other than the mark that is desired to be read out. That is, it is not possible to realize the optimum reproduction conditions across the whole surface. In order to resolve this problem, the strength of the reproduction beam should be varied according to the radial position. That is, the strength of the reproduction beam should be made less when moving toward the inner perimeter.

The information recorded on MSR media as above can be reproduced by an information reproduction apparatus of a similar construction to FIG. 1 and FIG. 6. The reproduction power of the beam of light is set so as to become a high power when moving toward the outer perimeter of the disk, as in the first and second preferred embodiments. For example, first the appropriate values of the reproduction power according to the radial position of the disk (it is desirable to be multiple locations) are stored in memory, such as memory 19. During reproduction, the strength of the beam of light should be controlled by calculating the appropriate reproduction power at the radial position on which reproduction is being performed based on these values of the reproduction power. The detection of the position in the radial direction projected thereon by the beam of light and the control of the strength of the beam of light can be performed in the same manner as the first and second preferred embodiments. The actions other than setting the values of the reproduction power can be performed in the same manner as the first and second preferred embodiments.

As explained above, by using the apparatus of the first preferred embodiment, it becomes possible to avoid the destruction of the information recorded on the optical disk. Also, by using the apparatus of the first preferred embodiment, because the reproduction power is changed according to the radial position of the disk, it becomes possible to reproduce at a better SIN ratio in comparison to reproducing at a constant power regardless of the radius of the disk.

By using the apparatus of the second preferred embodiment, for example, reproduction of magnetic super resolution (MSR) media is possible, and recording media having information recorded at high density can be used.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A method of reproducing information recorded on an optical disk, the information being reproduced by projecting a beam of light onto the optical disk, a power of the beam of light during reproduction increasing as the position in the radial direction of the optical disk on which the reproduced information is recorded increases, including the steps of:

determining when it is not possible to move the beam of light so as to correctly follow the information recording tracks formed on the optical disk; and moving the projection of the beam of light toward an outer perimeter of the optical disk without increasing the power of the beam of light when it has been determined that it is not possible to move the beam of light so as to correctly follow the information recording tracks formed on the optical disk.

2. The method of claim 1, wherein the information is recorded on the optical disk in a plurality of radially spaced zones according to a ZCAV method, and the power of the beam of light that is projected onto the optical disk is changed for each zone.

3. The method of claim 1, wherein the optical disk is a magnetic super resolution disk.

4. The method of claim 1, wherein the step of determining that it is not possible to move the light beam so as to correctly follow the information recording tracks formed on the optical disk includes monitoring the tracking error signal level.

5. The method of claim 1, wherein the projection of the beam of light is moved toward the outer perimeter of the optical disk when it has been determined that it is not possible to move the beam of light so as to correctly follow the information recording tracks formed on the optical disk, regardless of the position of the projection of the beam of light.

6. An information reproduction apparatus comprising:

an optical head that projects a beam of light onto tracks provided on a recording surface of an optical disk;

a controller that controls movement of the beam of light so as to follow the tracks on the optical disk, the controller also controlling a power of the beam of light during reproduction of data from the recording surface tracks to increase the power of the beam of light as the position of the beam of light in a radial direction of the optical disk increases so that the beam of light has a substantially constant reproduction power that is based on a position of the beam of light in the radial direction of the optical disk;

a reproduction circuit that generates signals reproduced by light from the beam of light that is reflected from the surface of the optical disk;

a tracking error detector that detects tracking errors indicating that it is not possible to move the beam of light so as to correctly follow the tracks;

the controller moving the projection of the beam of light toward an outer perimeter of the optical disk without increasing the power of the beam of light when the tracking errors are detected by the error detector.

7. The apparatus of claim 6, wherein the tracking error detector detects the tracking errors by monitoring a level of a tracking error signal.

8. The apparatus of claim 6, wherein the controller moves the projection of the beam of light toward the outer perimeter of the optical disk when the tracking errors are detected by the tracking error detector, regardless of the position of the projection of the beam of light.

9. An information reproduction apparatus comprising:

an optical head that projects a beam of light onto a recording surface of an optical disk;

a tracking device that causes the beam of light to be projected so as to follow tracks provided on the recording surface of the optical disk;

a detector that detects when proper tracking by the tracking device is not possible; and a controller that controls a power and a position of the beam of light such that, during reproduction of information from the optical disk, the power of the beam of light increases as the position of the beam of light increases in a radial direction of the optical disk when proper tracking is possible, and the controller moves the projection of the beam of light toward an outer perimeter of the optical disk without increasing the power of the beam of light when the detector detects that proper tracking is not possible.

10. The apparatus of claim 9, wherein the detector detects that proper tracking by the tracking device is not possible by monitoring a level of a tracking error signal.

11. The apparatus of claim 9, wherein the controller moves the optical head to an outer perimeter of the optical disk when it is detected by the detector that proper tracking is not possible.

12. The apparatus of claim 9, wherein the controller moves the projection of the beam of light toward the outer perimeter of the optical disk when the detector detects that proper tracking is not possible, regardless of the position of the projection of the beam of light.

* * * * *